(12) United States Patent
Palm

(10) Patent No.: US 9,825,767 B2
(45) Date of Patent: Nov. 21, 2017

(54) SERVICE BASED POWER MANAGEMENT IN A NETWORK

(71) Applicant: Broadcom Corporation, Irvine, CA (US)

(72) Inventor: Stephen Ray Palm, Irvine, CA (US)

(73) Assignee: AVAGO TECHNOLOGIES GENERAL IP (SINGAPORE) PTE. LTD, Singapore (SG)

(*) Notice: Subject to any disclaimer, the term of this patent is extended or adjusted under 35 U.S.C. 154(b) by 0 days.

(21) Appl. No.: 13/660,804

(22) Filed: Oct. 25, 2012

(65) Prior Publication Data

US 2013/0298174 A1   Nov. 7, 2013

Related U.S. Application Data

(60) Provisional application No. 61/641,293, filed on May 1, 2012.

(51) Int. Cl.
  *H04N 21/60* (2011.01)
  *H04N 21/443* (2011.01)
  (Continued)

(52) U.S. Cl.
  CPC .......... *H04L 12/12* (2013.01); *H04L 12/2809* (2013.01); *H04N 21/43615* (2013.01);
  (Continued)

(58) Field of Classification Search
  CPC ....... H04N 21/43615; H04N 21/43637; H04N 21/41407; H04N 21/436; H04N 21/47202;
  (Continued)

(56) References Cited

U.S. PATENT DOCUMENTS 6,353,765 B1   3/2002  Shinotsuka
7,739,718 B1 *  6/2010  Young et al. ................. 725/127
(Continued)

FOREIGN PATENT DOCUMENTS

KR   1020090062105 A   6/2009

OTHER PUBLICATIONS

"UPnP Low Power Architecture for UPnP™ Version 1.0", Contributing Members of UPnP Forum, Aug. 28, 2007, US, 44 pages.
(Continued)

*Primary Examiner* — Pankaj Kumar
*Assistant Examiner* — Alazar Tilahun
(74) *Attorney, Agent, or Firm* — Garlick & Markison; Harry S. Tyson, Jr.

(57) ABSTRACT

Power management techniques for a network device providing services to other network devices. In one embodiment, a first device communicates requests for access to and release of a resource (such as a media serving service) hosted by a second device. Power management functionality in the second device selectively controls power to the resource based, at least in part, on such requests. For example, a resource may be placed in an inactive state following receipt of a request for release of the resource. Access to the resource may be provided through a network interface that is separately activated or deactivated by the power management functionality. In further embodiments, information relating to the state of the resource and/or network interface is provided by a proxy device.

20 Claims, 7 Drawing Sheets

(51) Int. Cl.
  *H04N 21/442* (2011.01)
  *H04L 12/12* (2006.01)
  *H04L 12/28* (2006.01)
  *H04N 21/436* (2011.01)
  *H04N 21/63* (2011.01)

(52) U.S. Cl.
  CPC ... *H04N 21/4436* (2013.01); *H04N 21/44213* (2013.01); *H04N 21/63* (2013.01); *Y02B 60/32* (2013.01); *Y02B 60/34* (2013.01); *Y02B 60/41* (2013.01)

(58) Field of Classification Search
  CPC ......... H04N 21/4307; H04N 21/43622; H04N 21/4432; H04N 21/42204; H04N 21/4436; H04N 5/63; H04N 21/4104; H04N 2201/0049; H04N 7/181
  USPC ..................................... 725/79; 713/300–340
  See application file for complete search history.

(56) References Cited

U.S. PATENT DOCUMENTS

| | | | |
|---|---|---|---|
| 2005/0123109 A1* | 6/2005 | Yamagishi et al. ...... | 379/102.01 |
| 2005/0229226 A1* | 10/2005 | Relan ..................... | H04H 60/33 725/114 |
| 2006/0005052 A1* | 1/2006 | Roe et al. ..................... | 713/300 |
| 2006/0031887 A1* | 2/2006 | Sparrell et al. ................. | 725/78 |
| 2009/0158064 A1 | 6/2009 | Oh et al. | |
| 2011/0072103 A1* | 3/2011 | Goto ............................. | 709/208 |
| 2011/0087903 A1* | 4/2011 | MacDougall et al. ........ | 713/310 |
| 2012/0185718 A1* | 7/2012 | Miyoshi ........................ | 713/323 |

OTHER PUBLICATIONS

European Patent Office; European Search Report; EP Application No. 13001891.4; dated Jul. 30, 2013; 4 pgs.

* cited by examiner

SERVICE BASED POWER MANAGEMENT IN A NETWORK

CROSS REFERENCE TO RELATED PATENTS/PATENT APPLICATIONS

Provisional Priority Claim

The present U.S. Utility Patent Application claims priority pursuant to 35 U.S.C. §119(e) to U.S. Provisional Application No. 61/641,293, entitled "SERVICE BASED POWER MANAGEMENT IN A NETWORK," filed Jun. 1, 2012, which is hereby incorporated herein by reference in its entirety and made part of the present U.S. Utility Patent Application for all purposes.

BACKGROUND OF THE INVENTION

Technical Field of the Invention

The invention relates generally to power management in a network of devices; and, more particularly, certain embodiments relate to reduced power consumption in a device through the management and release of non-requested services.

Description of Related Art

Devices within a home such as televisions, set top boxes (STBs), audio systems, appliances, and computers are frequently cited as materially significant consumers of electricity within a home. Cumulatively, the amount of energy wasted by such devices is significant, and may have a negative impact on the ability of a power grid to meet peak energy demands. By reducing the power consumption of devices that are typically plugged into power outlets in a home, a consumer may reduce his or her total electric usage, leading to reduced expenditures for electricity and lessening potential impacts on the environment associated with energy generation. At times, users within a home may not realize a device is still consuming meaningful amounts of power, even though the device has been switched to a standby or "off" power state. This is due, in part, to a tendency of manufacturers to design their respective products such that much of the circuitry (such as communication interfaces) in a device remains active even when a user may perceive the device to be off in order to provide for quick responses to unpredictable user input.

Previous approaches to saving power have focused on reducing the energy consumption of an individual device. Such approaches have yielded notable improvements in overall power consumption for the collective set of individual devices in a home. For example, device circuitry itself has improved over generations of products such that less power is needed to perform a given function. Likewise, some functionality of a device may be deactivated for periods of time so that the overall consumption of power is reduced. These types of techniques have focused on reducing the power consumption of an individual device without consideration of other devices.

There has also been a trend towards communicatively coupling devices within a home through various means of communication. Such means often include networking and direct connection technologies. Connectivity between devices can be used to share information, resources or content between devices. Over time, it has become expected that devices remain active so as to maintain connectivity and facilitate ready communication. This mirrors recent consumer behavior of expecting devices to always be in a connected state. Accordingly, device manufacturers are often presented with opposing requirements: reducing the amount of time a device is active to reduce power consumption, and increasing the amount of time a device is active to facilitate communication.

DETAILED DESCRIPTION OF THE INVENTION

Aspects of various embodiments of the present disclosure relate to the functionality and signaling of requests for services and associated release of services of a connected device. Although the following description makes reference to particular communication network technologies and network entities, other network technologies supporting differing arrangements of network entities can be employed without departing from the spirit and scope of the present invention. In addition, the following description makes reference to "devices", "functions" and "functionality". A device performing a given function "x" as part of its operation can be referred to as an "x" device, or as an "x" function or "x" functionality, interchangeably, without departing from the spirit or scope of the present invention.

Figure 1A:
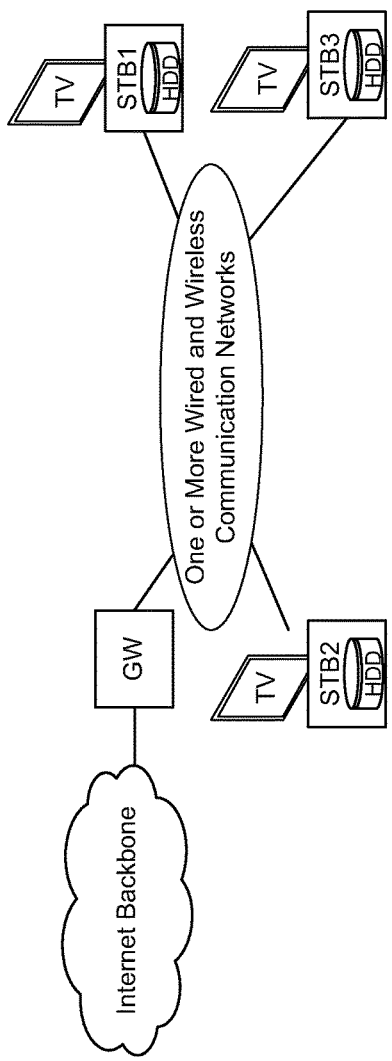
FIGS. 1A-1D are schematic block diagram representations of exemplary network architectures for transferring data between devices and various data storage locations.

FIGS. 1A-1D are schematic block diagram representations of exemplary network architectures for transferring data between devices and various data storage locations. Referring first to FIG. 1A, an exemplary home environment is illustrated with three television (TV) monitors for displaying entertainment or informational programming. The programming may originate from a variety of sources and may be distributed to the home via cable, satellite, xDSL, fiber optics, local wireless communication pathways, etc. A programming source may be part of a dedicated video distribution network such as a direct broadcast satellite network or cable television network that distributes content from a plurality of video sources. Alternatively, the programming source can be part of a heterogeneous network that includes one or more segments of a general purpose network such as the Internet, a metropolitan area network, wide area network, local area network or other network such as an Internet protocol (IP) television network. Over various portions of a given network, the programming content can be carried as analog and/or digital signals according to various recognized protocols.

The programming might include movies, television shows, commercials or other advertisements, educational content, video gaming content, infomercials, or other program content and optionally additional data associated with such program content including, but not limited to, digital rights management data, control data, programming information, demographic data, additional graphics data and other data that can be transferred in association with program content. Such video content may also have associated audio content. The video content can be sent as broadcast video, streaming video, video on demand and near video on demand programming, etc.

Within the home or other premises, programming may be distributed via one or more wired, optical and wireless communication local area networks (LANs), possibly via a gateway (GW) device. In the illustrated embodiments, each television monitor is typically connected to an interface device that transforms received signals and content for display on the television monitor. One common interface device is often referred to as a set top box (STB). Each STB in a traditional arrangement includes similar functionality and components such that similar types of programming and features may be enjoyed on individually connected television monitors. The functionality and components of a STB may include, for example, tuning resources, conditional access technology for protecting copyrighted material, and a hard disk drive (HDD) for recording and playback of programming/content in a time shifted manner.

Figure 1B:
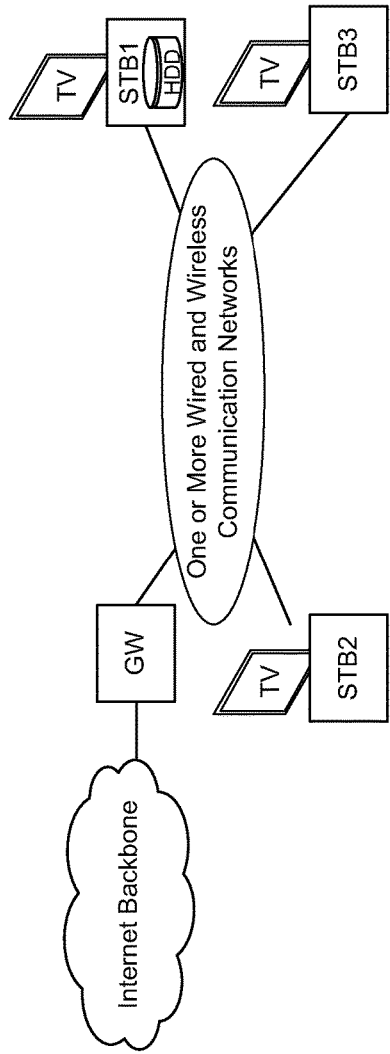
Figure 1C:
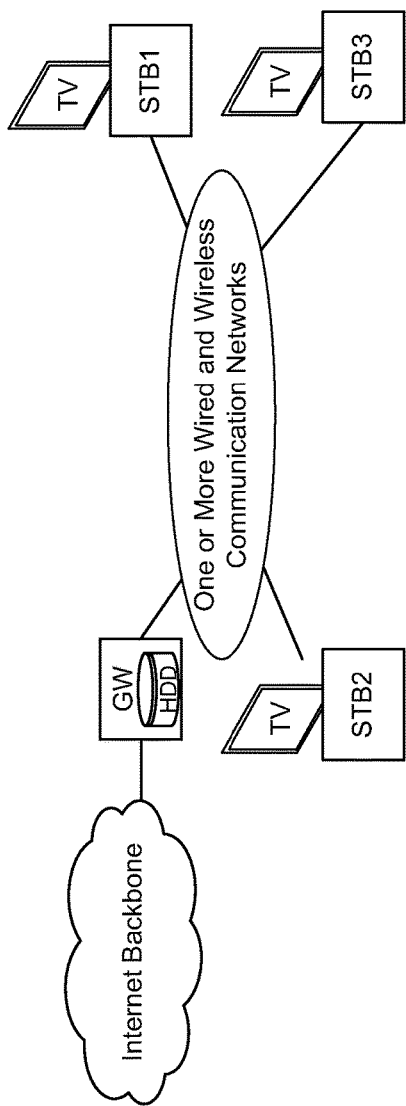

A typical commercial HDD has more capability and capacity than might be required by a single set top box. FIG. 1B illustrates a network topology that allows a single hard disk drive to be shared between a plurality of communicatively coupled STBs. Although the HDD is illustrated within STB1, the HDD may be located at one of several locations, including STB2 and STB3. Alternatively, the HDD may be external to the illustrated STBs. In FIG. 1C, for example, a shared HDD located within a gateway device is shown. In the foregoing arrangements, the HDDs may frequently be in an "always on" or spinning mode. By consolidating resources, there is an opportunity to reduce the total consumption of energy within a given premises. Thus, instead of three STBs, each with its own HDD and associated power consumption, there may be only a single HDD consuming power.

Figure 1D:
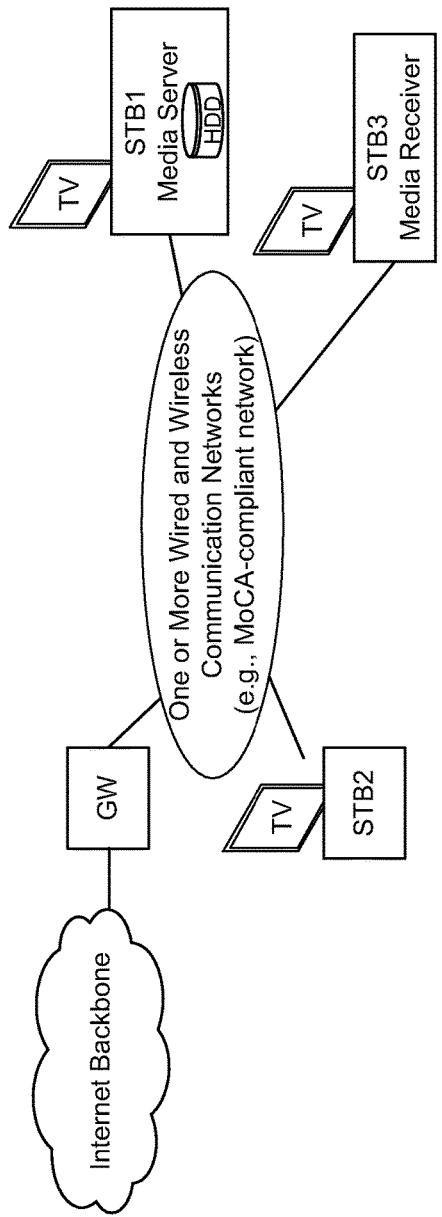

FIG. 1D illustrates a traditional network architecture for data transfer between devices using a connectivity technology such as that promulgated by the Multimedia over Coax Alliance (MoCA). In an exemplary case, device STB1 provides functionality(ies) to device STB3. The functionality may include services, content and/or resources (collectively referred to herein as "services" as contextually appropriate). In this example, STB1 functions as a "media server" and STB3 functions as a "media receiver".

Figure 2:
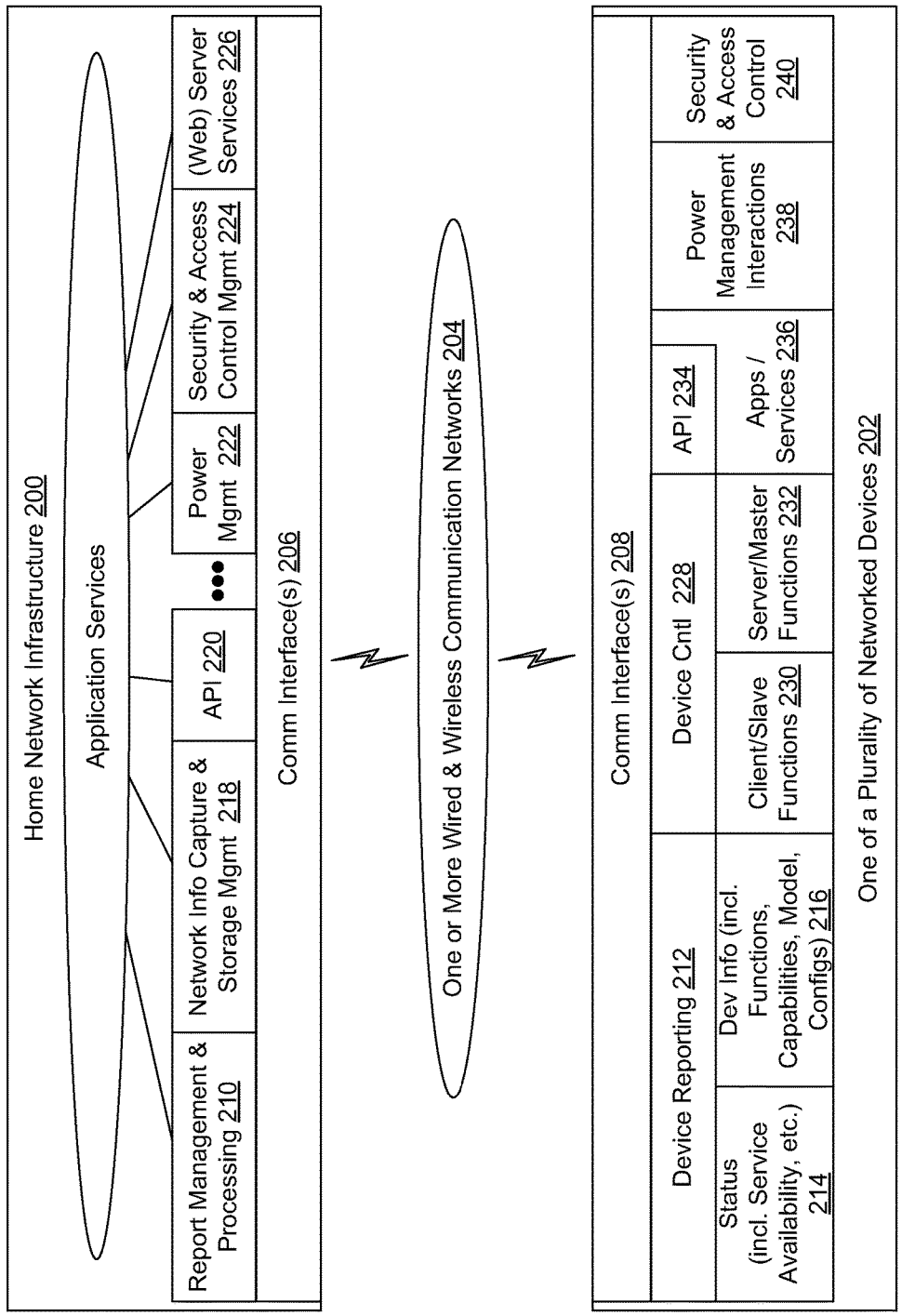
FIG. 2 is functional block diagram illustrating a home network infrastructure and devices in accordance with an embodiment of the present disclosure.

FIG. 2 is functional block diagram illustrating a generalized home network infrastructure 200 and a networked device(s) 202 in accordance with an embodiment of the present disclosure. Communications between the home network infrastructure 200 and networked device 202 may occur over one or more wired and wireless communication networks 204. The home network infrastructure 200 and networked device 202 are coupled to the communication networks 204 by respective communication interface(s), either of which may support communications with individual ones or a plurality of networked devices.

The home network infrastructure 200 of the illustrated embodiment includes a number of functions, services and resources to support formation and maintenance of a home network. In particular, report management and processing 210 receives information from device reporting functions 212 in associated networked devices 202. Such information may include, for example, service availability and other status data 214. In addition, the networked device 202 may provide device information 216 indicating, for example, device functions and capabilities, device model number(s), device configurations, software versions, attached peripherals and downstream devices, device resources and usage, etc. Device information relating to available resources and current resource usage may be utilized as described herein by various nodes in the home network infrastructure 200 for purposes of dynamic power management (such as power management of resources of a node by an internal power controller), resource allocation and management, access arbitration, etc. In various embodiments, the networked device 202 may have an obligation to gather, store and/or report device status/information at different times. For example, reporting may be required upon affiliation with the home network, on a periodic basis, and/or during operational engagements with other intra-/inter-network resources and devices.

Referring again to the home network infrastructure 200, additional functionality and resources include, without limitation: network information capture and storage management 218; an application programming interface (API) 220 that allows distributed software components and services to communicate with each other; power management functionality 222 as described more fully below; security and access control management 224 for maintaining the integrity of the network and affiliated data/resources; and (Web) server services 226. The home network infrastructure 200 further comprises other application services corresponding to the foregoing, as well as additional services such as those described herein. In one exemplary embodiment, the home network infrastructure 200 might determine (e.g., by means of device profile information) the category and nature of a device wishing to participate in the network. As necessary, functionality in the home network infrastructure 200 could then direct or trigger installation of appropriate application software (e.g., power management communication functions) and underlying drivers in the device. In other embodiments, the device may include pre-installed power management communication capabilities. Such operations might be performed with minimal involvement from inherent functions of the device.

In the illustrated embodiment, the networked device 202 comprises a number of additional functions and resources to support participation in the network. More particularly, device control functions 228 may include client/slave functions 230, server/master functions 232, and various combinations thereof. Slave functions might include, for example, device (re-)configuration, directed resource allocation, power management, managed resource arbitration, bridging operations, etc. Master functions enable the networked device 202 to establish, manage, and terminate various interactions between nodes or groups of nodes in the network, including interactions involving the networked device 202 itself.

The networked device 202 of the illustrated embodiment further includes an API 234 to support, for example, relevant applications and services 236 (which might comprise slave and master functions). Power management interactions 238 such as those described herein are also provided. In addition, security and access control layers 240 permit the networked device 202 to interface with or establish secure network connections and control access to internal and external network resources.

It is noted that numerous functional building blocks illustrated by FIG. 2 may be incorporated, in whole or part, in one or more (application specific) integrated circuit devices. For example, an integrated circuit device may include a reporting module to provide reporting functionality (including communication of service status and device characteristics), device control capabilities, master/slave functions, security and access control modules, etc. Such an integrated circuit device may also include onboard processing capabilities and/or interface with a processor device. Alternatively, several of the functions described above may be incorporated, in whole or part, into an operating system and/or software loaded above an operating system kernel.

Figure 3:
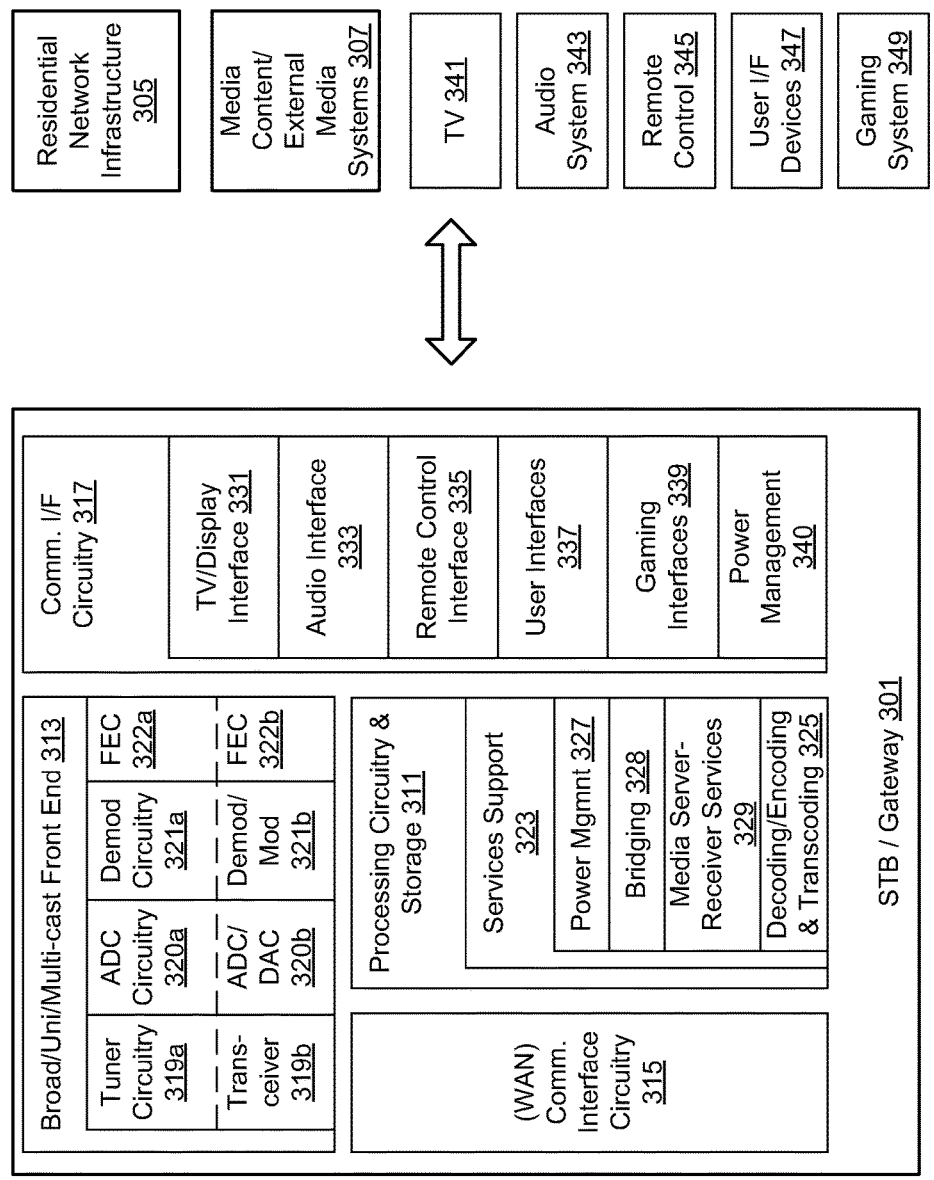
FIG. 3 is a schematic block diagram of a set top box (STB)/gateway (GW) in accordance with an embodiment of the present disclosure.

FIG. 3 is a schematic block diagram of a set top box (STB)/gateway 301 in accordance with an embodiment of the present disclosure. The STB/gateway 301 provides a number of functions, including conversion of signals from external sources into content that can be consumed by network devices. The STB/gateway 301 may further operate as a gateway that supports unidirectional or bidirectional communications and bridging between network devices.

The STB/gateway 301 of the illustrated embodiment interacts with a residential network infrastructure 305 and external media systems 307 via one or more wired and wireless networks/links. The wired and wireless networks/links may utilize one or more of various transmission media—such as coaxial cable, shielded twisted pair cable, fiber-optic cable, power line wires, and wireless media (radio frequencies, microwave, satellite, infrared, etc.)—and operate in accordance with a variety of communication and networking protocols (TCP/IP, UPnP, IPv6, etc.). In addition, the wired and wireless networks/links may comprise a multi-hop network utilizing a spanning tree protocol, direct wireless connections, peer-to-peer links, etc.

The external media systems 307 may comprise, for example, one or more of cable, satellite and/or terrestrial televisions systems. Various headend equipment and services can be utilized by these systems, such as a cable headend that receives television signals for further processing and distribution, and may offer various other services such as internet connectivity and VoIP services.

The STB/gateway 301 of the illustrated embodiment includes a broadcast/unicast/multicast front end 313 that operates to receive uncompressed or compressed digital video, digital audio and other data signals, from either the external media systems 307 or residential network infrastructure 305, for further processing and distribution. The front end 313 comprises tuner circuitry 319a operable to isolate particular channels. Signals from the tuner circuitry 319a are then provided to analog-to-digital (ADC) circuitry 320a and demodulation circuitry 321a for conversion into binary format/stream. Once in binary format, forward error correction (FEC) circuitry 322a checks the integrity of the received binary stream. Audio, video, and data extracted from the binary stream may then be decoded (e.g., by decoding 325) into formats suitable for consumption by downstream devices. It is noted that demodulation circuitry 321a may support one or more modulation techniques, such as Quadrature Phase Shift Keying (QPSK), Quadrature Amplitude Modulation (QAM), Coded Orthogonal Frequency-Division Multiplexing (COFDM), etc.

The front end 313 may be integrated into one or more semiconductor devices that may further support, for example, interactive digital television, networked DVR functionality, IP video over DOCSIS applications, and 3D graphics support. In addition, multiple tuner circuitry 319a (including in-band and out of band tuners), ADC circuitry 320a and demodulation circuitry 321a may be provided for different modulation schemes and television standards (such as PAL, NTSC, ATSC, SECAM, DVB-C, DVB-T(2), DVB-H, ISDB, T-DMB, Open Cable).

In one alternative embodiment of the disclosure, functionality of the STB/gateway 301 is performed by a smartphone or mobile computing device. In this embodiment, the "front end" 313 comprises one or more wireless interfaces (including PHY and baseband functions), such as a cellular (3G, 4G, IMT-Advanced, etc.) or wide area network (Het-Net, Wi-Fi, WiMax, etc.) interface. The interface may support one or more modulation and multiplexing techniques, such as OFDM, OFDMA, SC-FDMA, QPSK, QAM, 64QAM, CSMA, MIMO, etc. In the illustrated embodiment, the wireless interface comprises a transceiver 319b, analog-to digital (ADC) and digital-to-analog (DAC) circuitry, demodulation and modulation circuitry 321b and FEC (such as turbo codes or LDPC codes) circuitry 322b. Encoding, decoding and transcoding 325 functions may be provided by processing circuitry and storage 311.

The STB/gateway 301 also includes (wide area network) interface circuitry 315 for communicating with residential network infrastructure 305 and/or external media system 307. Through the communication interface circuitry 315, the STB/gateway 301 may communicate directly with upstream resources, or offer (bidirectional) bridged communications between such resources and devices (e.g., devices 341-349) coupled to the STB/gateway 301.

In the embodiment of FIG. 3, STB/gateway 301 interacts with a variety of devices 341-349 via communication interface circuitry 317. For example, a television or display interface module 331 communicates with a (digital) television 341 or other media display device to relay television programming and enable available interactive services. In certain embodiments, the television or display interface module 331 might include a remote user interface (RUI) server. Similarly, an audio interface 333 provides audio programming or audio library access to an audio system 343.

The communication interface circuitry 317 further comprises a remote control interface 335 for receiving control signals from a remote control 345. In addition to traditional remote control operations, the remote control 345 may further offer voice and/or gesture control signals that are relayed or mapped to relevant consumer devices. User interfaces 337 are also provided for communications with one or more user interface devices 347. Gaming interfaces 339 function to provide interactive communications with a gaming system 349. Such communications may involve, for example, online, multiplayer gaming between members of a social network and/or external players in a gaming platform. Power management interface 340 functionality is provided to enable power saving operations between devices 341-349.

The STB/gateway 301 of the illustrated embodiment includes processing circuitry and storage 311 (components of which may be comprised of hardware, software, or combinations thereof), services support 323, and decoding/encoding/transcoding functionality 325 to support network interactions such as those described above. Services support 323 in this embodiment includes various functions such as power management 327 operable as set forth herein, bridging 328, and media server-receiver services 329. It is noted that the processing circuitry and storage 311 may be made available in whole or part as a network resource.

It is noted that some manufacturers control the power consumption of a particular device by using a power controller within the device to reduce the amount of time that the device functionality or components are active. Within a single device, that methodology can be effective (and not unduly bothersome for a user) because the device's power control functionality can monitor, control and restore components within that single device. For example, the power controller of a device might cause the HDD within the storage functionality to be inactive during periods of time when it is not being utilized to serve, record or view a piece of content. Within a single device, the power controller has ready access to internal information and requests, such as a recording schedule or user input.

Figure 4:
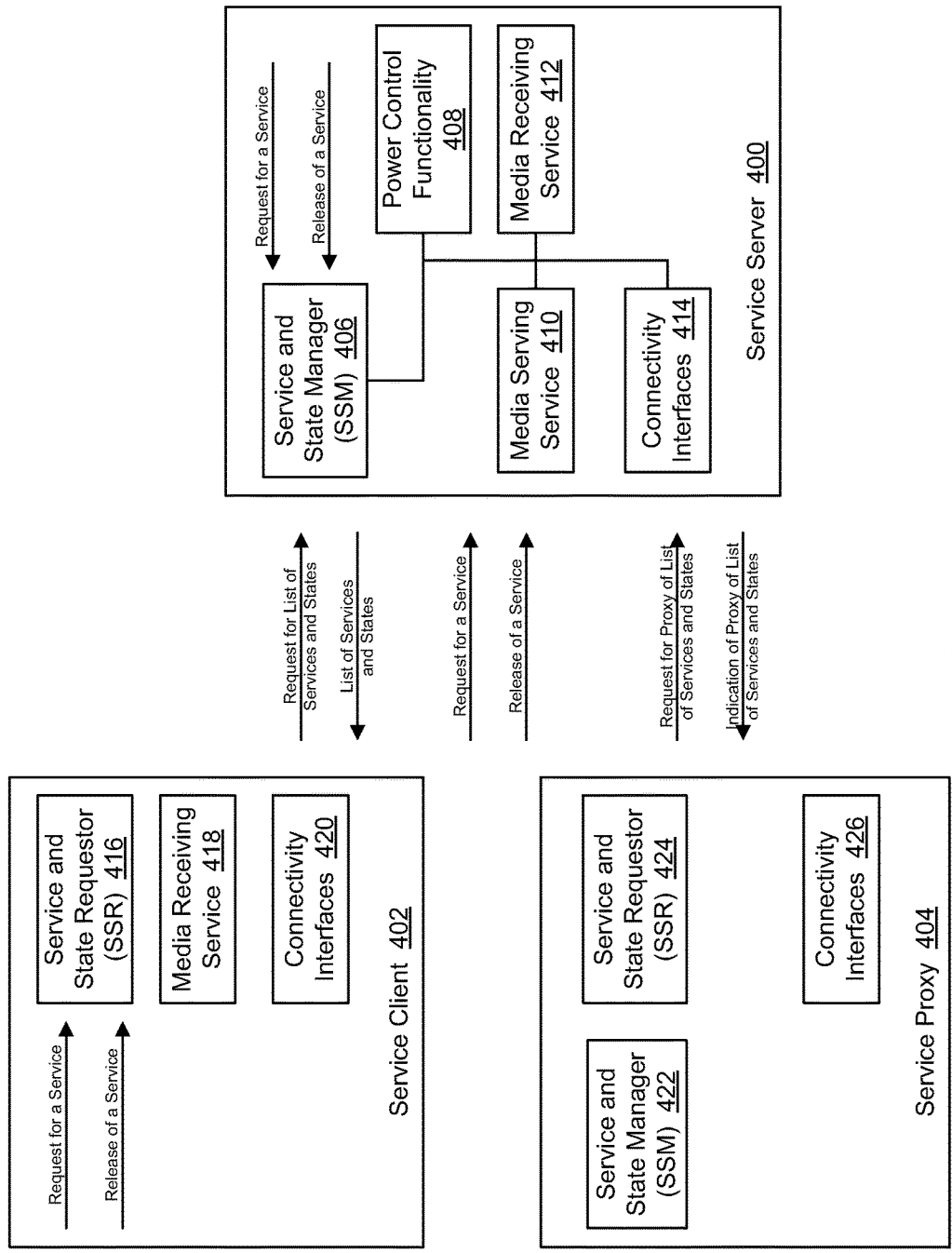
FIG. 4 is a functional block diagram illustrating service/resource based power management in accordance with an embodiment of the present disclosure.

FIG. 4 is a functional block diagram illustrating service/resource based power management in accordance with an embodiment of the present disclosure. Using the example of three STBs (or like devices) intending to share the resources of a single HDD as an illustration, novel techniques are provided herein to communicate resource requests and resource releases to external resources. If all pending requests for a particular resource are released, the power controller associated with the resource may force the resource into an inactive state in order to reduce power consumption. A given device may incorporate multiple types of resources including, by way of example and without limitation, communication resources, media serving and media receiving services, processing capacity, storage resources, applications, transcoding resources, tuning resources, security resources, etc.

Heretofore in the industry, a device has generally been considered a monolithic entity in terms of power state. Historically, a device was considered to have power states of "on" or "off", wherein an off state or off switch would completely remove power from the device. Over time, components within a device were provided separate and individually switchable power sources, allowing some components to be on while other components were off. For example, the display functionality of a device might be inactive, while separate storage functionality remained active. This collection of individual states is often labeled "stand-by" for convenience of users. The controlling of components has become further nuanced in that individual components may be switched on or off for certain periods of time.

A physical product, sometimes referred to as a physical device, is composed of a mixture of physical circuits and software that can be represented as logical entities. For example, the logical entities can be in the form of networking communication layers or operational functionalities or components. Moreover, within a physical device implementing an embodiment of the disclosure, there may be additional logical functions that represent communication methods and frameworks. For example, in the context of a physical device that is a STB, additional functionality such as DLNA and UPnP compatible functionality may be present. Both DLNA and UPnP provide certain functionality, and those standards also provide a framework for extending that functionality. While one implementation is described in the context of extending the DLNA and UPnP frameworks, it will be understood that the present invention is not limited to those standards/frameworks. Additionally, messaging between devices is typically carried by a Layer 1 and Layer 2 connectivity technology (for example, Wi-Fi, IEEE 802.11ad, WiGiG or MoCA) using a Layer 3 network layer technology such as the Internet Protocol (IP) and a Layer 4 transport or session technology such as TCP, UDP, SOAP, etc. While implementations of the disclosure are described in the context of extending such technologies, the present invention is not limited to disclosed standards/frameworks.

Further, a given communication component interface may have different states of operation, with each state typically having different characteristics of operation. For example, a MoCA 2.0 compatible interface has the following states: Active (M0), Low Power Idle (M1), Standby (M2) and Sleep (M3). The states differ in the ability of the interface to transmit or receive messages, receive control data, and transition to other states. As another example, a Wi-Fi client interface may utilize the Wi-Fi Multimedia Power Save (WMM-PS) technique. A particular type of communication interface may have a Layer 2 specific means to communicate and request power states between device interfaces that is independent of other functionality within a device. However, prior communication interfaces do not have the means to indicate why the communication interface power state is changing, or why the particular functional components may remain active or inactive.

A client device may indicate to its (Layer-2) serving device that one or more of its communication interfaces are to be periodically inactive. The serving device may buffer messages from the media server or other interface while relevant communication interfaces of the client are in the inactive period. If the client needs to communicate with the server while the communication interface is inactive, it could either turn on the communication interface or wait until its scheduled active time. If the server or client application/services have knowledge of the inactive periods, either could choose an appropriate time to initiate communication. In particular if another component is inactive, its state can be signaled.

In addition, the following suppositions may be applicable when considering certain advantages of a network implemented in accordance with the present disclosure: a physical device has separate and distinct entities/resources/services within it that can be individually controlled; an internal power controller makes many if not all decisions about how to manage its resources within a physical device; an external requesting device generally does not know details of the internal characteristics of another physical device; an internal power controller receives request both internally and externally to its physical device; an internal power controller may choose not to honor a request provided that it signals that decision; and external devices do not request another physical device's particular functional blocks to change power state. Further, even though a communication interface is one component within a physical device that can have states such as active, dozing, standby, inactive, etc., a means of communication is nevertheless typically necessary between two physical devices. However, a communication interface may have delayed characteristics in certain power states. If a communication interface within one device is inactive during the time another external device attempts to communicate, the communication may be discarded or in some cases may be buffered and delayed.

Typically, the entire set of functional blocks inside a physical device will not simply be in "sleep" or "awake". Some may be "awake" while some may be "asleep". In particular, home network connectivity is often never totally asleep such that resource requests can be made of it. Functions inside the physical device such as video output, transcoding, content server, etc. may transition between "sleep-like" and "awake-like" states depending on local and remote requests.

Referring more particularly to FIG. 4, service server 400 functionality is depicted in a physical device. Within the service server 400, a service and state manager (SSM) 406 responds to internal and external requests for a listing of and status of services within the physical device, and responds to requests for particular services as well as releases of particular services. The SSM 406 communicates with internal resources such as the power control functionality 408 and individual services, for example a media serving service 410 and a media receiving service 412. The SSM 406 and power control functionality 408 of the illustrated embodiment further interact with one or more connectivity interfaces 414.

In the illustrated embodiment, server client 402 functionality is also depicted in a physical device. Within the server client 402, a service and state requestor (SSR) 416 responds to or initiates (via connectivity interfaces 420) internal and external requests for communication of a listing and status of services within the physical device, and responds to requests for or release of particular services. The SSR 416 communicates with internal resources such as individual services, for example a media receiving service 418.

In one exemplary mode of operation, when a user desires to watch a piece of content that is stored on another device, the user interacts with an associated service client 402 device. The SSR 416 interacts over a communication link with the SSM 406 of the service server 400. The SSR 416 may first request a listing of services (and associated states) available on the service server 400. After determining a suitable service, for example the media serving service 410, the SSR 416 may request that the SSM 406 make the service available to the service client 402, either immediately or at a desired time in the future. Depending on the state of various components within the service server 400, the SSM 406 interacts with the power control functionality 408 to activate the necessary components for the media serving service 410. The media serving service 410 may already be active if there have been other requests for its use. When the service client 402 is finished utilizing a piece of content, the SSR 416 interacts with the SSM 406 over a communication link to release the media serving service 410. The SSM 406, in conjunction with power control functionality 408, may cause the components of the media serving service 410 to return to a non-active state depending on other requests for that particular service.

In the illustrated embodiment, a service server 400 may desire (by configuration or user interaction) to place many functions, including the connectivity interface(s) 414, in a non-active state yet still make its services available to other devices. When the connectivity interface is in a non-active state, requests to a SSM 406 may be delayed or dropped. In order to mitigate such issues, a third physical device—the service proxy 404—may cache and provide proxied information on behalf of the service server 400. Once the service proxy 404 and service server 400 have mutually agreed for the service proxy 404 to cache the relevant information, the service proxy may use its SSR 424 to obtain the information that is stored in its SSM 422 on behalf of the service server SSM 406. The service proxy 404 responds on behalf of service server(s) 400 with information relating to potentially available services. Such information might include, for example, the state of the connectivity interface(s) 414, and the times and means by which the connectivity interface(s) 414 might be available for further communication. Information may also be provided for contacting the service server 400 directly. Alternatively, a service proxy 404 may be configured to respond to a request by only reporting current power state information relating to the service server 400. In one embodiment, requests for a change of state are communicated directly with the service server 400. Thus, the service proxy 404 allows a service client 402 to be aware of a service server 400, even if it is presently unable to respond on its own behalf.

In one embodiment, the information relating to the state of a service may be carried as a supplement to information carried about services. For example, a simple service discovery protocol (SSDP) within the UPnP framework, or the UPnP Low Power service state variables might be utilized. Extension to SSDP might include a per service basis, instead of a per device basis. In another embodiment, information relating to the state of the service may be carried as an amendment to existing service information. In yet another embodiment, information relating to the state of a service can be carried as a supplement to the information provided about the service, for example extending Bonjour or mDNS. Alternatively, the information may be contained in an XML document carried using HTTP. In yet another embodiment, information regarding the state of the connectivity interface 414 may be communicated using Layer 2 TLVs in an IEEE 1905 compliant framework. In a further embodiment, information about the state of the connectivity interface 414 may be carried using Layer 2 means built into the interface.

In one embodiment, each of the following items of information may be included in the connectivity power state information/description: connectivity state number or name, sleep period, latency of response time (if different from sleep period), burst bit rate, multicast or unicast connectivity, limits of message length, etc. Further, each of the following information may be included in the service power state information/description: active, non-active, next scheduled active period, request for future active period, service limitations, one of an enumerated set of values corresponding to power levels, etc. A given physical device may contain various combinations of the illustrated capabilities of service server 400, service client 402 and service proxy 406.

Figure 5:
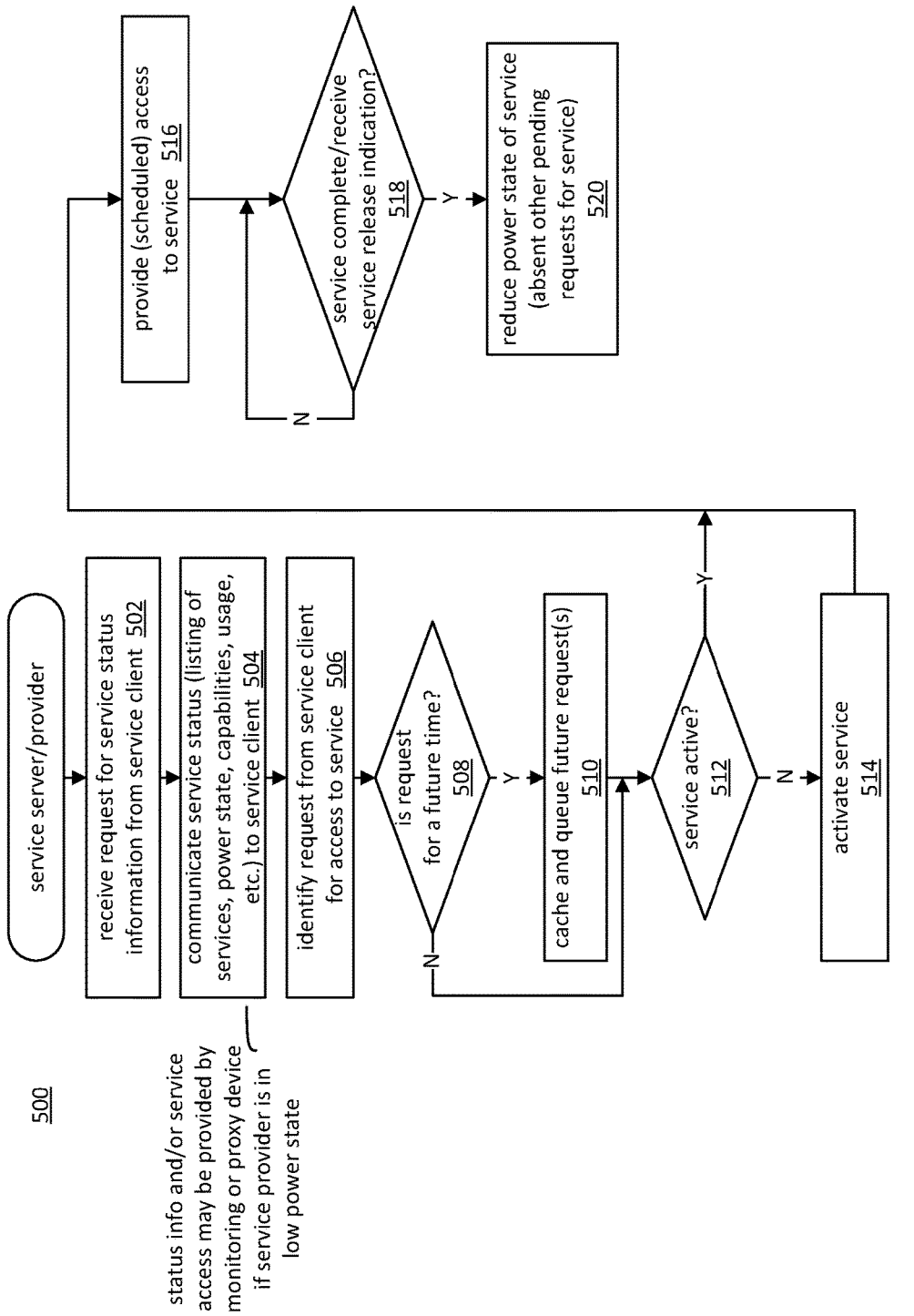
FIG. 5 is a logic diagram of a method for power management in accordance with an embodiment of the present disclosure.

FIG. 5 is a logic diagram of a method 500 for power management in accordance with an embodiment of the present disclosure. In step 502 of this embodiment, a service server/provider receives a request for desired service status information from a service client. Such service status information might include, without limitation, a listing of supported services, power state information, service capabilities, service usage status, the state of relevant connectivity interfaces, the future availability of the connectivity interfaces, an implicit/explicit request for access to a service, an acknowledgement of current service availability (which may be interpreted as a grant of access by certain service client devices), etc. The service server responds in step 504 by communicating responsive service status information to the service client. Such information may be provided by a proxy device in certain embodiments (e.g., when the service server is not able to provide a timely response due to power state or service status considerations). In turn (or in conjunction with the initial request in step 502), the service client may initiate a request for access to a desired service as identified in step 506. In one embodiment, step 502 might be performed during configuration, initiation or periodic maintenance operations of the service client, with a subsequent request for access to a service being initiated at an unspecified point in the future.

Next, in step 508, if it is determined that the request is for access to the service at a future time, the request is cached and queued for execution in step 510. In some embodiments, the service server may choose to begin initiation of a requested service prior to the desired time, such that the service is fully availability and active at the desired time. If the service client request is immediate and the service is currently inactive as determined in step 512, the service server/provider activates the service (step 514) prior to providing service access to the service client in step 516.

Next, in step 518, the service server/provider awaits detection of a service completion, with may be indicated by a service release notification, timer expiration, or other means. Following detection of such a service release, in step 520 the service server/provider of the illustrated embodiment causes the service to enter a reduced power state (for example, an off state), thereby affording network power savings for the collection of devices and services. The reduced power state may be deferred or delayed as necessary to address unrelated and pending requests for service.

Figure 6:
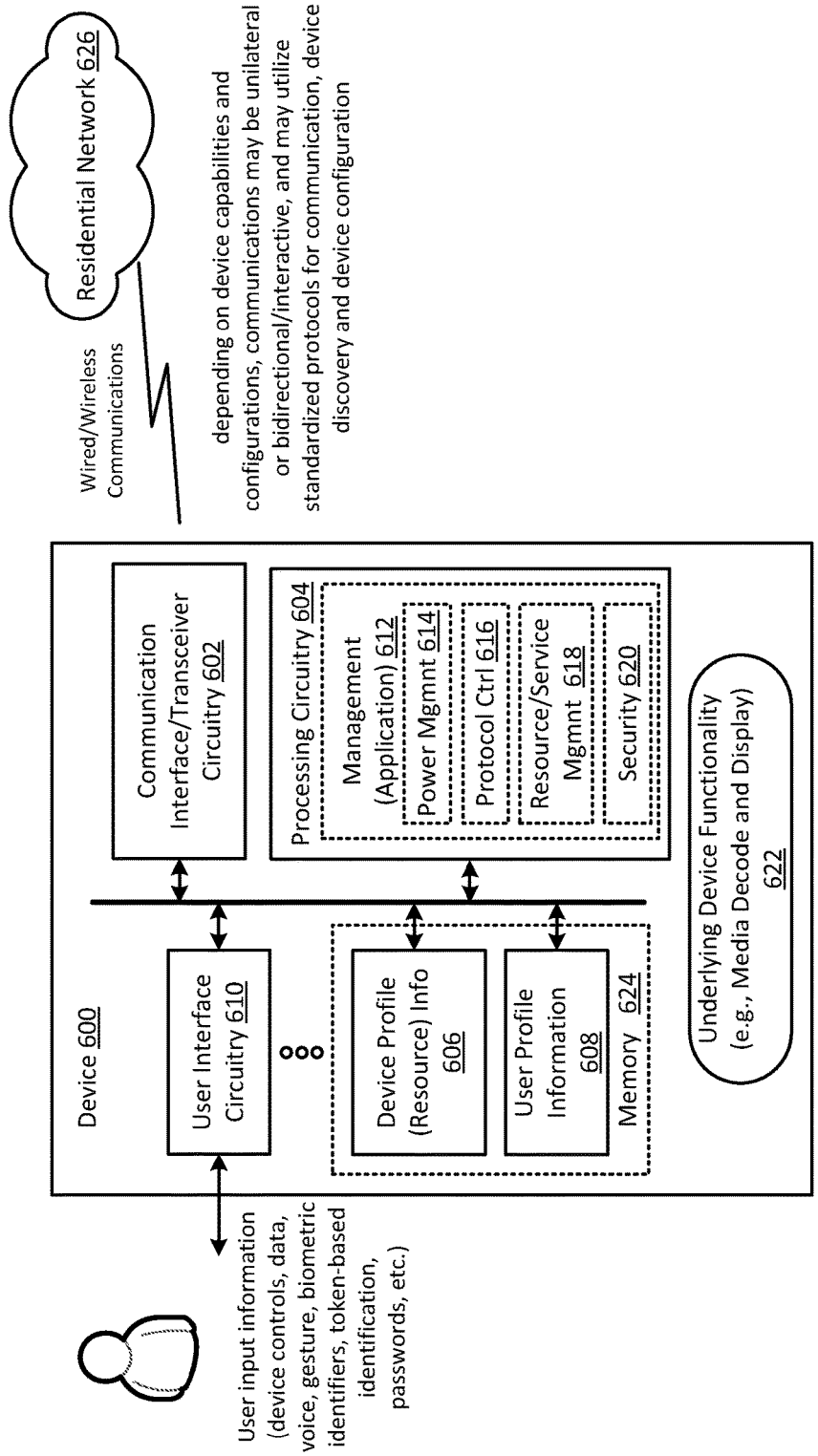
FIG. 6 is a schematic block diagram of an embodiment of a device comprising integral functionality operable to support power management techniques in accordance with the present disclosure.

FIG. 6 is a schematic block diagram of an embodiment of a device comprising integral functionality operable to support power management techniques in accordance with the present disclosure. In the illustrated embodiment, a communication interface and transceiver circuitry 602 is operable to perform wired or wireless communications between the device 600 and a residential network 626 over one or more communication channels. Depending on the capabilities and configuration of the device 600, communications with a network may be unilateral or bidirectional/interactive, and utilize either a proprietary or standardized communication protocol. Communications may include, for example, device profile and resource information, user and device profile information, control signals, audio/video content, interactions with hosted service data, user data, relayed information, requests for and releases of services, etc.

The device 600 further includes processing circuitry 604 operable to process and manage communications, services and associations between the device and other network nodes, third parties, software agents, etc. More particularly, the processing circuitry 604 may include, for example, a software management application 612 comprising one or more of power management logic 614 (including support for service discovery such as that described above), communication protocol control 616, resource/service management 618, and security/authentication 620 functionality.

The device 600 further may utilize profile information that may take many forms and be maintained in static or dynamic memory 624. Such profile information enables a device and/or user to present an image of itself and its capabilities to other nodes of a network. In particular, device/resource profile information 606 and user profile information 608 may be utilized in various ways in accordance with the disclosure to facilitate a variety of power management interactions. Depending on the capabilities and requirements of a particular device, a device or user profile may be static or dynamic.

In certain embodiments, the device 600 may interact with a user(s) via user interface circuitry 610. User input to the device 600 may include, for example, data entry through a keypad, touchscreen, remote control device, gaming controller, device control buttons, voice or gesture commands, storage device, etc. Authorized access to or control of the device 600 can be facilitated through unique biometric identifiers, passwords, token-based identification, trusted authorities or documents such as a driver's license or passport, and like authentication or payment means.

The device 600 may perform core or underlying functionality 622. For example, the device may operate as a media player having media decoding and/or rendering functions, as well as display capabilities. In other embodiments, the device may primarily function as a networking interface or communication device, or be programmable to perform specific functions within a network.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributed (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present disclosure has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for managing power consumption in a local area network of devices, the devices including a service server device having at least one internal service allocable for use by a service receiver device of the local area network of devices, the method comprising:
   identifying a request, from the service receiver device, for service status information relating to a service of the service server device;
   communicating, by the service server device, responsive service status information to the service receiver device, wherein the responsive service status information includes at least one of identification information relating to the service or a response time latency of a connectivity interface of the service server device;
   identifying, by the service server device, a request from the service receiver device for access to the service of the service server device;
   activating power to the service of the service server device in response to the request for access from the service receiver device, wherein activating power to the service of the service server device is performed by the service server device autonomously and without reliance on an external power state change request from the service receiver device; and
   scheduling, by the service server device, access to the service for utilization by the service receiver device.

2. The method of claim 1, wherein communicating the responsive service status information further comprises communicating power state information relating to the service.

3. The method of claim 2, wherein the power state information comprises at least one of an enumerated set of values corresponding to power levels.

4. The method of claim 1, wherein communicating the responsive service status information further comprises providing a list of available services.

5. The method of claim 1, the responsive service status information including at least one item of information selected from the group consisting of: capabilities of the service, usage status of the service, a power state of a connectivity interface of the service server device, current availability of the service, or future availability of the service.

6. The method of claim 1, further comprising:
   identifying a service release request from the service receiver device; and
   in response to the service release request, placing the service in a reduced power state, wherein placing the service in a reduced power state is performed by the service server device autonomously and without reliance on an external power state change request.

7. The method of claim 1, the local area network of devices further including a proxy device having proxy capabilities, the step of communicating the responsive service status information to the service receiver device performed by the proxy device on behalf of the service server device.

8. The method of claim 7, the responsive service status information further comprising an indication of future availability of the service.

9. The method of claim 7, the step of activating power to the service of the service server device in response to the request for access occurring following completion of a scheduled period of inactivity of a communication interface of the service server device via which access to the service is provided to the service receiver device.

10. The method of claim 1, the step of activating power to the service of the service server device in response to the request for access comprising activating a communication interface of the service server device via which access to the service is provided to the service receiver device.

11. The method of claim 1, the service comprising a media serving service.

12. The method of claim 1, wherein identifying a request for service status information relating to the service comprises identifying a request for access to the service by the service receiver device.

13. A method for managing power consumption in a local area network of devices, the devices including a service server device and a service receiver device, the service server device including an internal power controller for controlling power states of a service provided by the service server device, the method comprising:
receiving, from the service receiver device, a request for access to the service of the service server device;
in response to the request for access, activating the service of the service server device, wherein activating the service is performed by the internal power controller of the service server device autonomously and without reliance on a power state change request from the service receiver device;
providing, by the service server device, access to the service to the service receiver device;
identifying a request, from the service receiver device, for release of the service; and
in response to the request for release of the service, the internal power controller of the service server device selectively placing the service in a reduced power state.

14. The method of claim 13, the local area network of devices comprising at least one additional service receiver device, further comprising:
prior to the step of selectively placing the service in a reduced power state, identifying a pending request for access to the service by the at least one additional service receiver device.

15. The method of claim 14, further comprising:
delaying placing the service in a reduced power state until a request for release of the service is received from the at least one additional service receiver device.

16. The method of claim 13, the local area network of devices further including a proxy device having proxy capabilities, further comprising:
communicating, by the service server device, service status information relating to the service of the service server device to the proxy device for use in proxy operations.

17. A service serving device operable to interact with a local area network, the local area network supporting a plurality of additional devices including at least one service client device, the service serving device comprising:
an allocable resource;
interface circuitry coupled to the allocable resource, the interface circuitry configured to provide a service client device access to the allocable resource via the local area network;
processing circuitry, coupled with the interface circuitry, that:
identifies a request from the service client device for service status information relating to the allocable resource;
in response to the request for service status information, communicates service status information relating to the allocable resource, wherein the service status information includes at least one of identification information relating to the allocable resource or a response time latency of the interface circuitry for providing the access to the allocable resource to the service client device; and
identifies requests from the service client device for access to and release of the allocable resource; and
a power management controller coupled to the processing circuitry and the allocable resource, the power management controller selectively providing power to the allocable resource in response to the requests from the service client device for access to and release of the allocable resource, wherein selectively providing power to the allocable resource is performed without reliance on a power state change request from the service client device.

18. The service serving device of claim 17, the power management controller further configured to selectively provide power to the interface circuitry to enable access to the allocable resource in response to identified requests from the service client device for access to the allocable resource.

19. The service serving device of claim 17, wherein the service status information comprises power state information relating to the allocable resource.

20. The service serving device of claim 17, the allocable resource one of a plurality of services, wherein the service status information comprises an indication of available services of the plurality of services.

* * * * *